United States Patent [19]
Yevick

[11] 4,385,798
[45] May 31, 1983

[54] PIEZOELECTRIC LIGHT BEAM DEFLECTOR

[76] Inventor: George J. Yevick, 536 Nordhoff Dr., Leonia, N.J. 07605

[21] Appl. No.: 187,737

[22] Filed: Sep. 16, 1980

[51] Int. Cl.³ .............................................. G02B 5/14
[52] U.S. Cl. ................. 350/96.14; 358/200; 358/901; 350/96.20; 350/96.29
[58] Field of Search .............. 350/96.20, 96.28, 96.29, 350/6.1, 6.2, 6.5, 484, 96.14; 358/199, 200, 231, 233, 901

[56] References Cited

U.S. PATENT DOCUMENTS 3,349,174 10/1967 Warschauer .................... 358/199 X
3,442,570 5/1969 Picker ............................. 350/484 X
3,836,225 9/1974 Wilde et al. ...................... 350/6.2

*Primary Examiner*—Paul L. Gensler
*Attorney, Agent, or Firm*—Thomas J. Greer, Jr.

[57] ABSTRACT

An optical apparatus for the deflection of a stationary beam of light to move the beam over two mutually perpendicular directions for projection onto a viewing screen. By suitably modulating the beam of light, images may be produced on the screen, as in the manner of TV images. The apparatus is defined by a piezoelectric bimorph of a known type which has been modified according to this invention so as to make each bimorph layer totally internally reflecting. The light deflection apparatus, also according to this invention, is made from a single bimorph provided with an extension of lesser mass and hence of lesser inertia. The main bimorph portion is electrically stimulated to oscillate it in a vertical (Y-axis) direction, and the extension is electrically stimulated to move it in a horizontal (X-axis) direction. The stationary beam of light is projected through the bimorph and onto the screen.

12 Claims, 15 Drawing Figures

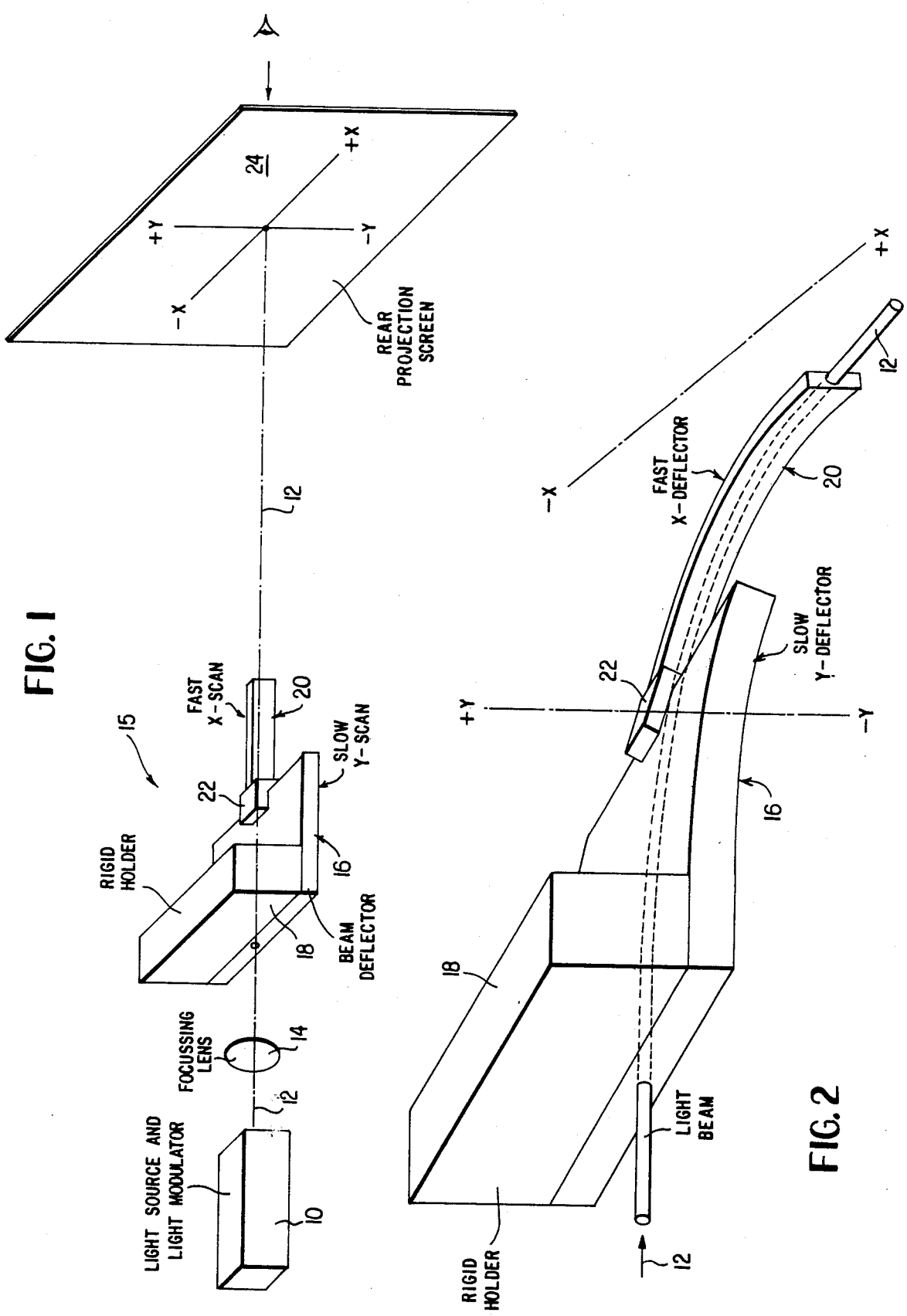

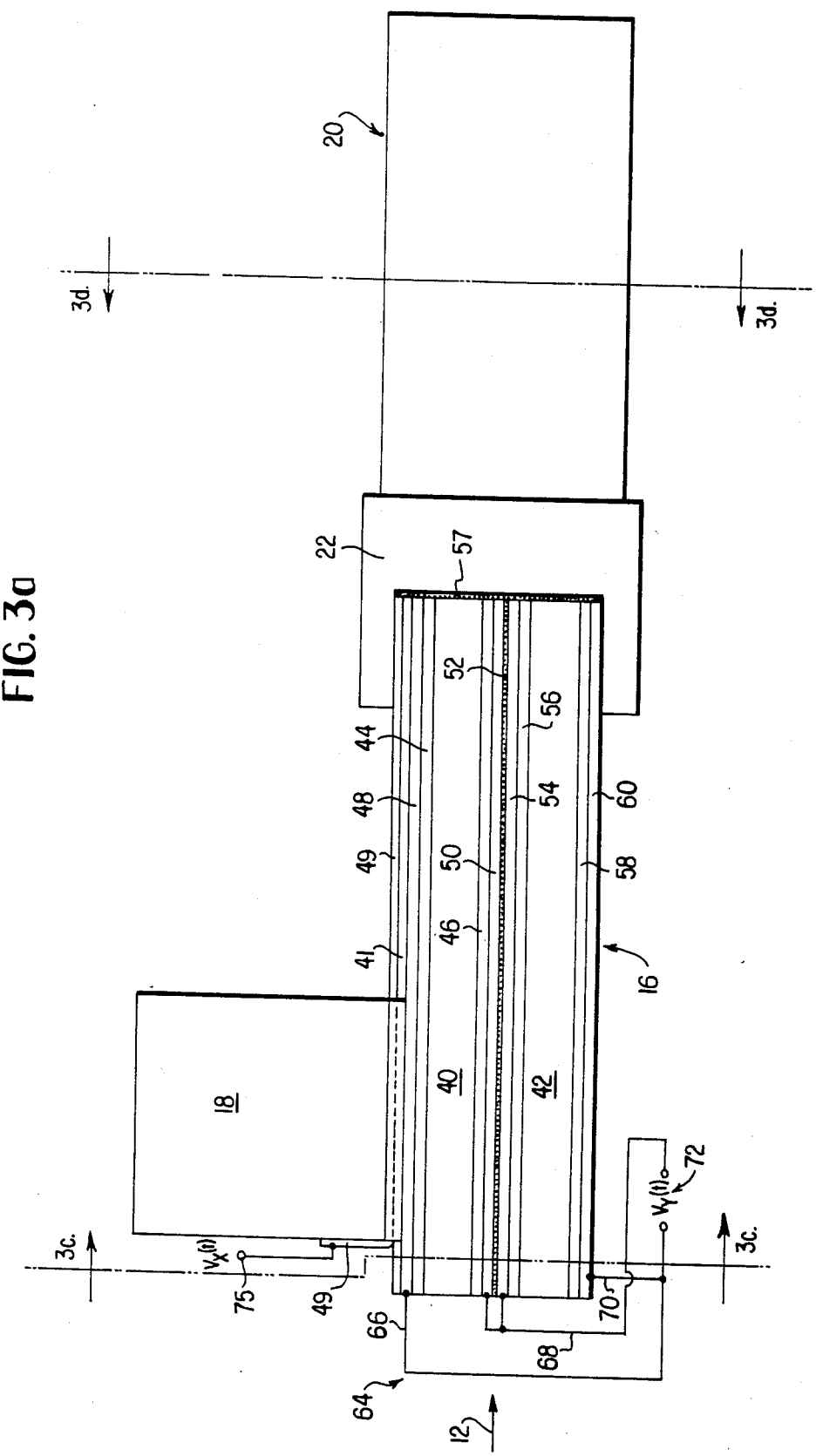

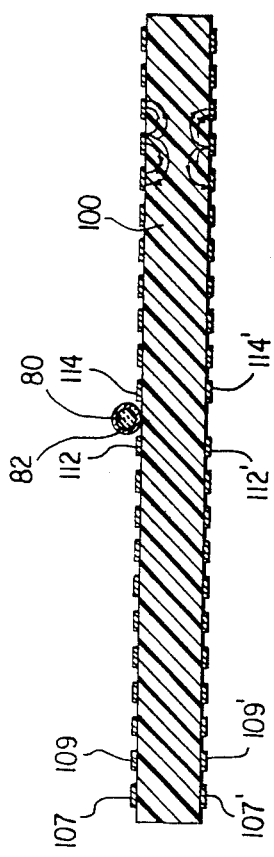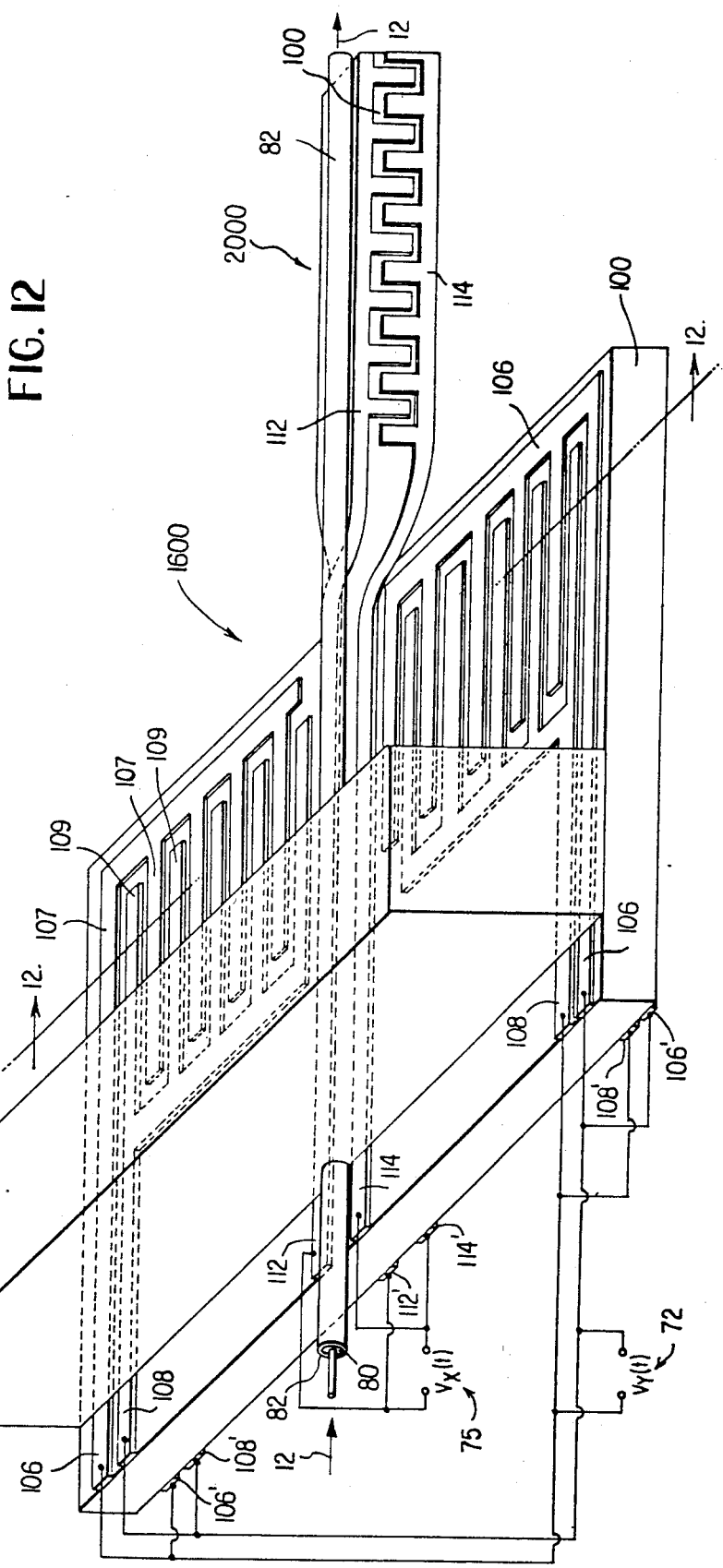

4,385,798

PIEZOELECTRIC LIGHT BEAM DEFLECTOR

This invention relates to an optical deflection device of the type known as a piezoelectric bimorph. Such devices are often formed from a piezoelectric polymer known as $PVF_2$, which one end of the bimorph (or in some cases a multimorph) being fixed. These devices are also termed bimorph transducers, cantilever bimorph structures or cantilever multimorph structures. These devices are known in the art and exhibit the property of bending or flexing when suitably stimulated by an electrical potential, the potential applied by sheet electrodes carried on opposite surfaces of each piezoelectric layer. The reader may refer to the following literature references, hereby incorporated by reference, for further background. Vibrational Fan Using Piezoelectric Polymer $PVF_2$ by Toda and Osaka, Proceedings of the IEEE, Volume 67, No. 8, August 1979, pages 1171, et seq., and references mentioned therein. A New Electromotional Device by Toda et al, page 24, RCA Engineer 25-1, June/July 1979, and references cited therein.

U.S. Pat. No. 3,836,225 issued to Wilde and Viele discloses an optical deflection device which performs a similar function to that of the present invention. In Wilde, the X-deflecting bimorph is separate from the Y-deflecting bimorph (X referring to the horizontal and Y to the vertical). A pair of optical fiber bundles, one for each bimorph, is employed by Wilde to carry the light beam.

By the practice of this invention, several advantages over the structure shown by Wilde and Viele are realized. The first is that an optical fiber is not essential. The second is that only a single bimorph element or bimorph piece need be employed.

Yet another advantage enjoyed by this invention over Wilde and Viele is that the light beam is confined within a narrow channel. This channel is an extension (which may be integral or separate) of the main bimorph piece, which channel has a small cross-section constituting the final, exiting end. In Wilde, the exiting end is the Y-scanner which is a sheet having many light conducting paths therein, along which the light beam can diffuse or scatter to thereby introduce optical noise into the system. The mass of the extension is significantly less than that of the main bimorph piece.

With regard to the necessity, in Wilde, of an optical fiber, I have discovered that by making the individual bimorph layers totally internally reflecting, a stationary beam of light entering one end, will exit from the other (free) end of the layer or layers. By known techniques of electrical stimulation of the bimorph to cause it to flex, the exiting light will sweep over an arc. The frequency of such sweeping may be made very high because the inertia of the final bimorph is small.

This manner of transmission of light through a flexing multilayer device is to be distinguished from a light deflection system such as shown in U.S. Pat. No. 4,025,203 issued to Lee. There, a mirror is located at the free end of a cantilever beam structure which is electrically stimulated, the mirror reflecting a beam of light over an arc. However, the inertia of the mirror is relatively high and accordingly, there exists a relatively low upper frequency limit to thereby lessen the utility of this type of apparatus to deflect a beam of light.

In accordance with the invention, by properly modulating both the intensity and the color of the stationary beam fed into the fixed end of the bimorph, moving color images are projected on a viewing screen, to thereby realize color television.

In a still further embodiment of the invention, a single layer piezoelectric element may be used to effect bending of a cantilever light beam deflector.

This invention, in its application to the field of television, differs from the usual cathode ray tube (CRT) display apparatus. In a CRT type system, a beam of electrons, invisible itself to the human eye, is variably deflected by charged plates or magnetic coils. After deflection, the beam strikes a phosphor layer on the front inside end of the CRT and the phosphor layer emits, through the front of the CRT, light which is visible to the human eye. In the present invention, a conduit or guide for visible light is itself deflected so as to directly project visible light on a viewing screen. Neither an electron beam nor a phosphor layer is necessary. The practice of this invention is made possible, at those high beam deflection frequencies attendant TV images, by the low inertia of the second bimorph, as well as the property which I have endowed them with of having their own internal reflection characteristic.

IN THE DRAWINGS:

FIG. 1 is a partially schematic perspective view illustrating the invention as applied to a television system.

FIG. 2 is a view on a different scale of a portion of FIG. 1 and illustrates first and second cantilever bimorph structures lying in mutually orthogonal planes for deflecting/transmitting an incoming, stationary beam of light in two mutually perpendicular directions.

FIG. 3a is an elevational or side view of the double cantilever bimorph shown at FIG. 1.

FIG. 3c is a view taken along section 3c—3c of FIG. 3a.

FIG. 3d is a view taken along section 3d—3d of FIG. 3a.

FIGS. 11 and 12 are views corresponding to FIGS. 9 and 10, respectively, and illustrate the use of a single layer piezoelectric device carrying a totally internally reflecting light fiber similar to the fiber of FIG. 6.

Figure 3B:
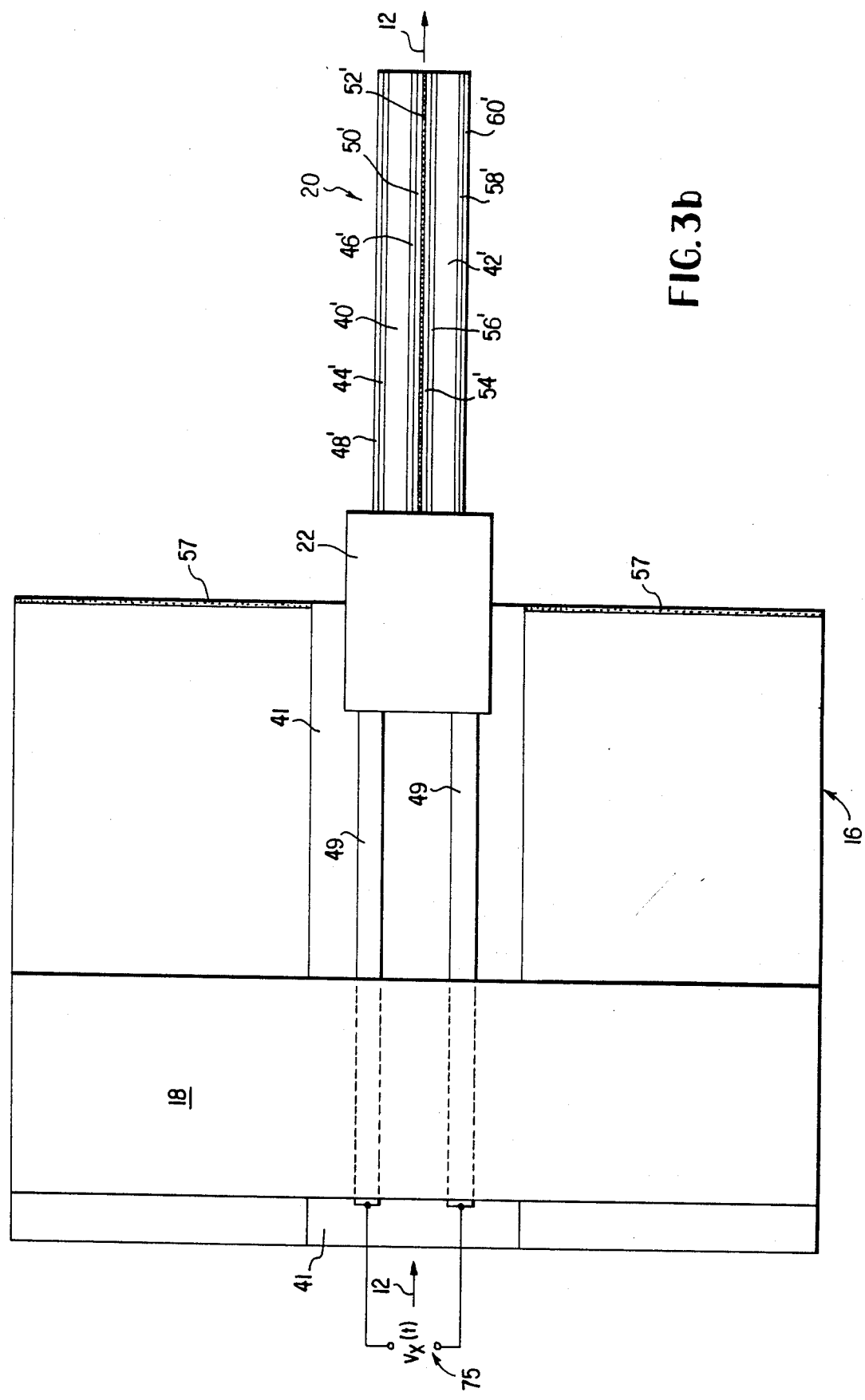
FIG. 3b is a top or plan view of the double cantilever bimorph of FIG. 1.

Referring now to FIG. 1 of the drawings, the numeral 10 denotes a light source and a light modulator which may be of any convenient construction. The details of this device, its exact mode of fabrication and operation are not necessary for an understanding of this invention. In general, the light modulator 10 is employed whenever this invention is to be used to project images on a screen, as in a television system. When not used in a television system, the light deflecting device of this invention exhibits utility for deflecting light, independent of whether or not it is to be used in a television system. The numeral 12 denotes an optic axis along which a beam of light from source 10 passes through a focusing lens 14, the bimorph light deflector 15 according to this invention, and to a viewing screen 24. Images are viewed on the opposite screen side, as indicated by the eye to the right of the screen. The numeral 16 denotes a first piezoelectric bimorph, to be later described in detail, and the numeral 20 denotes a second piezoelectric bimorph, again later to be described in detail. The screen 24 is illustrated in association with two mutually perpendicular directions, the usual X and Y axes. In turn, each of these directions has a plus direction and a minus direction.

Referring now to FIG. 2 of the drawings, the bimorph 15 of FIG. 1 is shown in greater detail as including a holder 18, such as a block of a rigid material, the bottom edge of which is suitably secured, as by adhesive, to a rear, upper portion 16 of a main or first piezoelectric bimorph element. The element 16 lies in a plane when not electrically stimulated. At FIG. 2, bimorph 16 is shown as flexed or curved, as when under the action of electrical stimulation. The numeral 20 denotes another elongated piezoelectric bimorph element, also lying, when not electrically stimulated, in a single plane. The normal, unstimulated position of each bimorph element 16 and 20 is in mutually orthogonal planes, as may also be seen by a consideration of FIG. 1. In FIG. 2, bimorph 20 is shown as flexed or bent, as when under the influence of an electrical stimulation. The numeral 22 denotes a coupler between the two bimorph elements 16 and 20. As shown at FIG. 2, a light beam from source 10 passes along longitudinal axis 12 and enters one edge of main or first piezoelectric bimorph 16, passing along its longitudinal, optic axis, and enters the colinear, longitudinal optic axis, it emerges from the exit or free end of bimorph 20 and strikes viewing screen 24.

Before proceeding to a detailed explanation of the construction of optical bimorph deflector 15, the general mode of operation illustrated at FIGS. 1 and 2 will now be offered. When stimulated by a variable source of electrical potential, each bimorph element 16 and 20 flexes. In FIG. 2, bimorph 16 has been illustrated as flexing downwardly, although it will be understood that the impression of a different electrical potential would cause it to flex upwardly, as well known in this art. The same is true with respect to bimorph element 20, namely, at FIG. 2 it has been illustrated as flexing to the right, while the impression of a different electrical stimulating potential would cause it to flex to the left.

The action of stimulating electrical potentials on piezoelectric bimorph devices is, as noted above, already known. That is to say, the impression of stimulating potentials to the piezoelectric bimorph elements causes the same flexing and bending moments which take place in the practice of this invention.

Light from the source 10, or from any other source, passes through focusing lens 14 and into a fixed, light-receiving edge of main bimorph 16. Bimorph 16 is provided with conventional electrodes which, when electrically stimulated, cause it to flex or bend. Additionally, and in accordance with the practice of this invention, bimorph 16 has had its piezoelectric layers coated with a suitable optical layer or coating (later to be described in detail) so as to render each piezoelectric layer totally internally reflecting. The light beam 12 exits through the free end of bimorph 16 and enters the attached end of piezoelectric bimorph 20. This latter element normally lies in a plane at right angles to the plane which contains bimorph 16. As with bimorph 16, bimorph 20 is provided with electrodes to receive stimulating electrical potentials. Further, its individual piezoelectric layers have also been coated with a suitable optical layer or coating to render it totally internally reflecting. The light beam which has passed through bimorph 16 now exits after passing through bimorph 20 from the free end of the latter, and strikes viewing screen 24. The beam of light from source 10 may pass through both piezoelectric layers of bimorph 16 and of bimorph 20, or alternatively, it may pass through only one piezoelectric layer of each.

The rate of impression of stimulating potentials to bimorph 16 is less rapid than that applied to bimorph 20. The free end of X-deflector bimorph 20 sweeps across, horizontally, as the free end of Y deflector bimorph 16 moves upwardly and downwardly. The result is a raster pattern of the screen 24, completely similar to the conventional raster pattern of a cathode ray tube. The reader will now be in the position to visualize that by suitable modulation of light source 10, images may be formed on screen 24.

The requirement that the X-scan be more rapid than the Y-scan is easily accomplished by this invention because the inertia of bimorph 20 is much smaller than the inertia of bimorph 16.

A description will now be offered of the details of construction of light deflector 15, together with several embodiments thereof.

Referring now to FIGS. 3a, 3b, 3c and 3d, the numeral 40 denotes a first piezoelectric layer which is coated, according to the practice of this invention, by optical coatings or layers 44 and 46 on opposite top and bottom sides thereof. Coatings 44 and 46 are of an index of refraction less than the index of refraction of transparent, piezoelectric layer 40, so that light entering one edge of layer 40 will be totally internally reflected as it passes from left to right. The numerals 48 and 50 denote electrically conductive coatings, such as coatings or aluminum or any other conductor. The numeral 42 denotes a piezoelectric layer of identical material, size, shape and construction to element 40, and is also provided with optical coatings 56 and 58 on opposite top and bottom sides thereof for rendering layer 42 totally internally reflecting. The numerals 54 and 60 denote electrically conductive coatings over the surface of piezoelectric layer 42, identical in construction to electrically conductive coatings 48 and 50. The numeral 52 denotes a conductive adhesive layer which mechanically bonds conductive coatings 50 and 54. The elements 40 and 42, together with their associated optical and electrical coatings define first piezoelectric bimorph element 16. If the light beam from source 10 is projected only through one of the piezoelectric layers 40, 42, then that layer alone need be optically coated to make it internally reflecting.

The numeral 41 denotes an electrically insulating layer extending, as shown at FIG. 3b, from the fixed or left end of element 16 to the free or right end. A pair of spaced electrodes 49 extends from the rear or fixed edge of element 16 to the front or free edge. Electrodes 49 carry stimulating electrical potentials to bimorph 20, as will be explained in detail with respect to FIGS. 4 and 5.

Figure 3C:
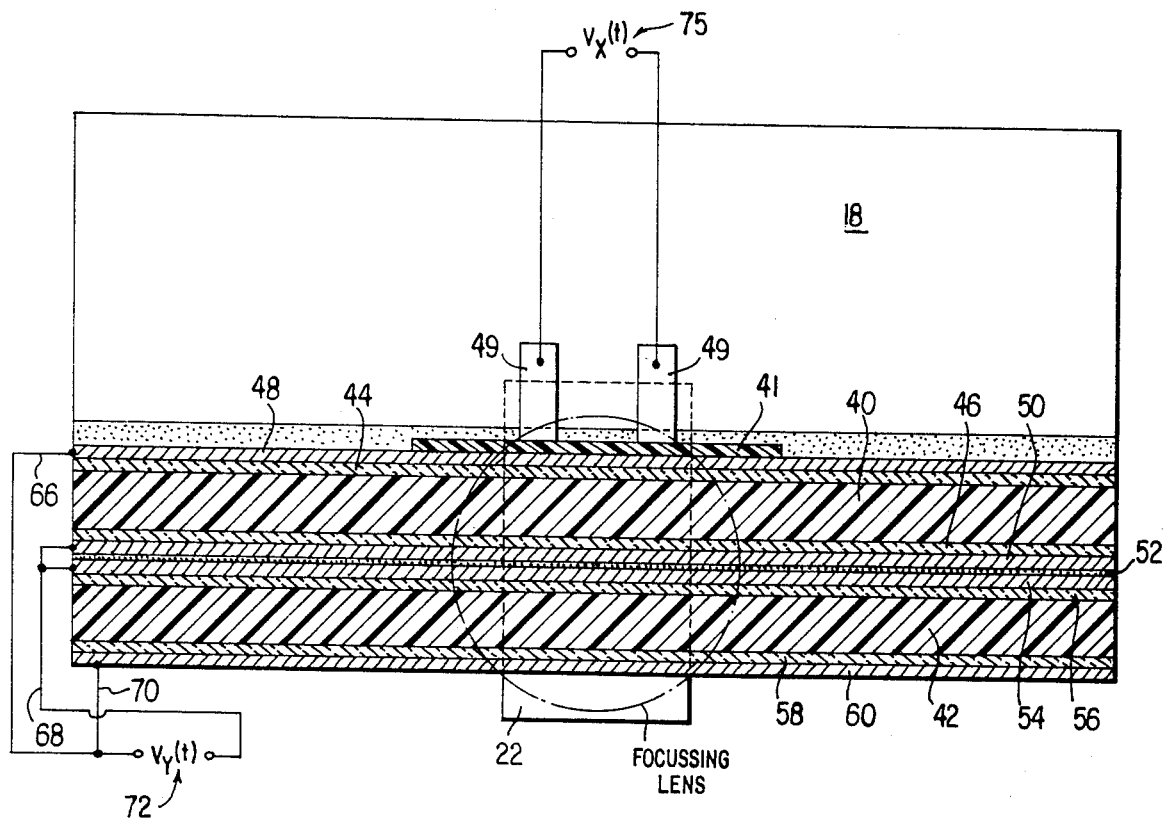
Figure 3D:
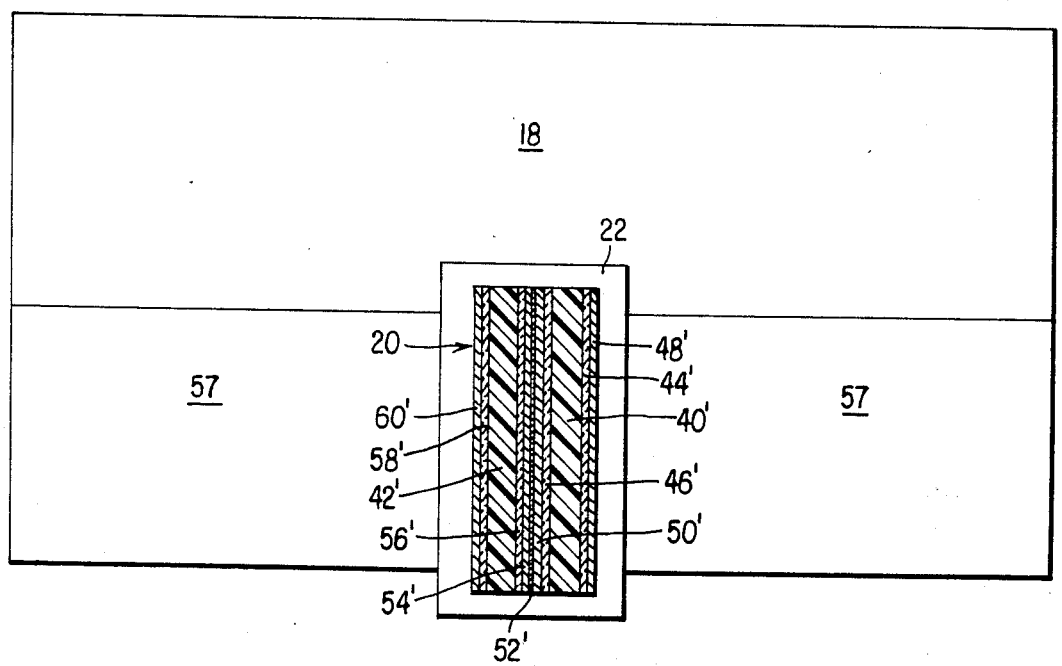

The connections for the stimulating electrical potentials for bimorph 16 are denoted generally by the numeral 64, see the left portion of FIG. 3a. There, lines 66 and 70 carry electrical potentials to, respectively, conductive coatings 48 and 60, while lead 68 splits and carries the same potential to conductive sheets 50 and 54. The numeral 72 denotes generally a source of stimulating electrical potentials for oscillating the free end of bimorph 16 in the Y or vertical direction, as viewed at FIG. 1. The electrodes 49, as shown at FIG. 3c, are connected to a source of potential denoted generally by the numeral 75 and carry stimulating electrical potentials for oscillating the free end of bimorph 20 in the horizontal or X direction. Referring now specifically to FIG. 3d, the same numerals are applied to bimorph 20, except that they are primed. Thus, numerals 40' and 42', denote two piezoelectric bimorph layer elements, with numerals 44' and 46' denoting the optical layer for element 40', and 56' and 58' denoting the corresponding optical coating for 42'. The conductive layers are denoted by 48' and 50' for layer 40', with corresponding conductive layers for element 42' denoted by 54' and 60'. The conductive adhesive layer between 50' and 54' is denoted by 52'.

The numeral 57 denotes an opaque coating at the right edge of bimorph 16. The coating extends from the sides of bimorph 16 to connector 22, since the light ray passing along axis 12 from light source 10 goes only through the central portion of bimorph 16.

Figure 4:
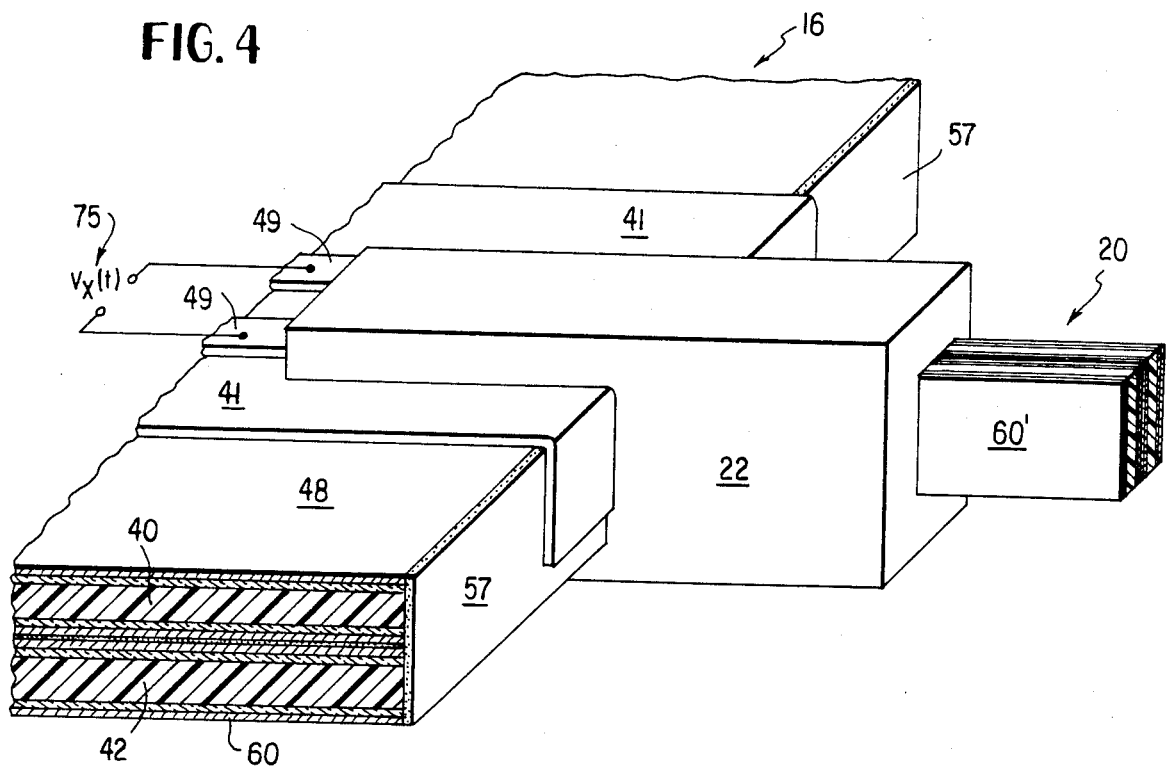
FIG. 4 is a partial perspective view illustrating one type of coupling between different bimorph section pieces.
Figure 5:
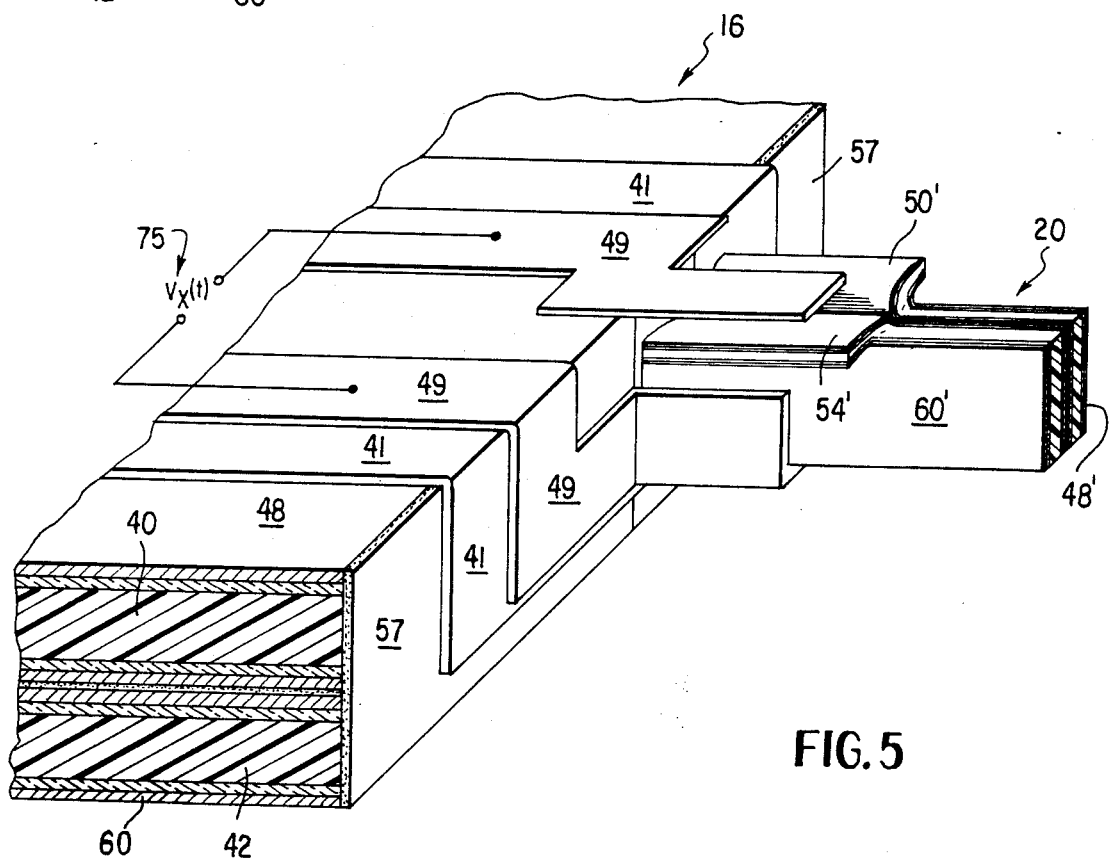
FIG. 5 is a partial perspective view of FIG. 4 prior to final assembly and showing the electrical connections onto the X-bimorph.

Referring now to FIGS. 4 and 5 of the drawings, the left or fixed end of bimorph 20 is shown as abutting the right end of bimorph 16, so that light passing through the former will pass through bimorph 20. A joint or connector 22, which may be formed of plastic such as epoxy resin, is used to rigidly connect the two bimorph elements 20 and 16. As shown at FIG. 5, electrodes 49 extend beyond the right edge of bimorph 16. The uppermost electrode 49, as viewed at FIG. 5, forms an electrical connection with conductive surfaces 50' and 54' as indicated. The latter conductive surfaces are, at the time of manufacture of bimorph 20, extended as indicated so as to, upon assembly, come into bearing contact with upper electrode 49. The two laminates which respectively contain conductive surfaces 50' and 54', are similarly extended at the time of manufacture, as shown at FIG. 5. Lower electrode 49, as viewed at FIG. 5, forms a generally U-shaped extension which receives and is in electrical contact with both outermost conductive layers 60' and 48'. After the assembly shown at FIG. 5 is completed, connector 22 is applied, as by resin molding.

Figure 6:
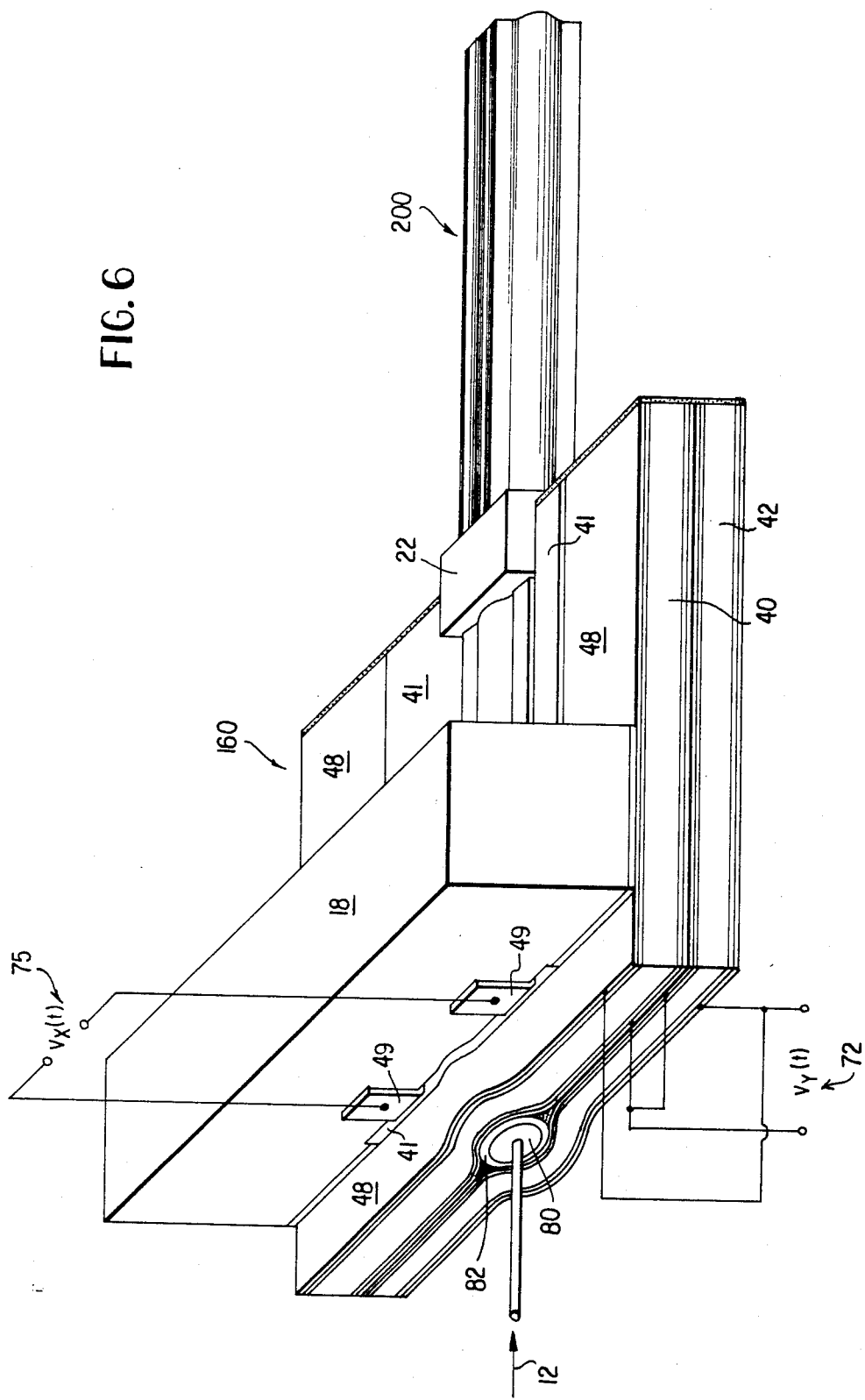
FIG. 6 is a perspective view of another embodiment wherein a stationary beam of light is made to pass through a totally internally reflecting light fiber, or light fiber bundle, the fiber or fiber bundle being carried by and sandwiched between two piezoelectric bimorphs.

Referring now to FIG. 6 of the drawings, another modification is illustrated which employs a totally internally reflecting fiber. The central core of the fiber is denoted by the numeral 80, and is provided with the usual cladding 82. The light conducting fiber 80, 82 is placed between the horizontally extending piezoelectric elements 40 and 42 of bimorph 160 (corresponding to bimorph 16 in the previously described embodiment) and is also sandwiched between piezoelectric layers 40' and 42' (see FIG. 3d) in a similar manner. The light conducting element 80, 82 is flexible. The only difference in operation between this and the embodiment described with respect to FIGS. 3a–3d is that the light passing along axis 12 enters the light conducting fiber 80, 82 prior to striking the viewing screen. The free end of bimorph 160 as well as the free end of bimorph 200 (corresponding to bimorph 20) operates in the same manner as previously described. Because the light from source 10 passes through fiber 80, 82 the optical coatings on the piezoelectric layers 40, 42 are not required, nor are the corresponding coatings on extension 200 required. While the fiber 80, 82 is shown as sandwiched by the piezoelectric layers 40, 42, it will be apparent that the fiber may be carried on one side only of each bimorph 16, 20 instead of between the layers.

Figure 7:
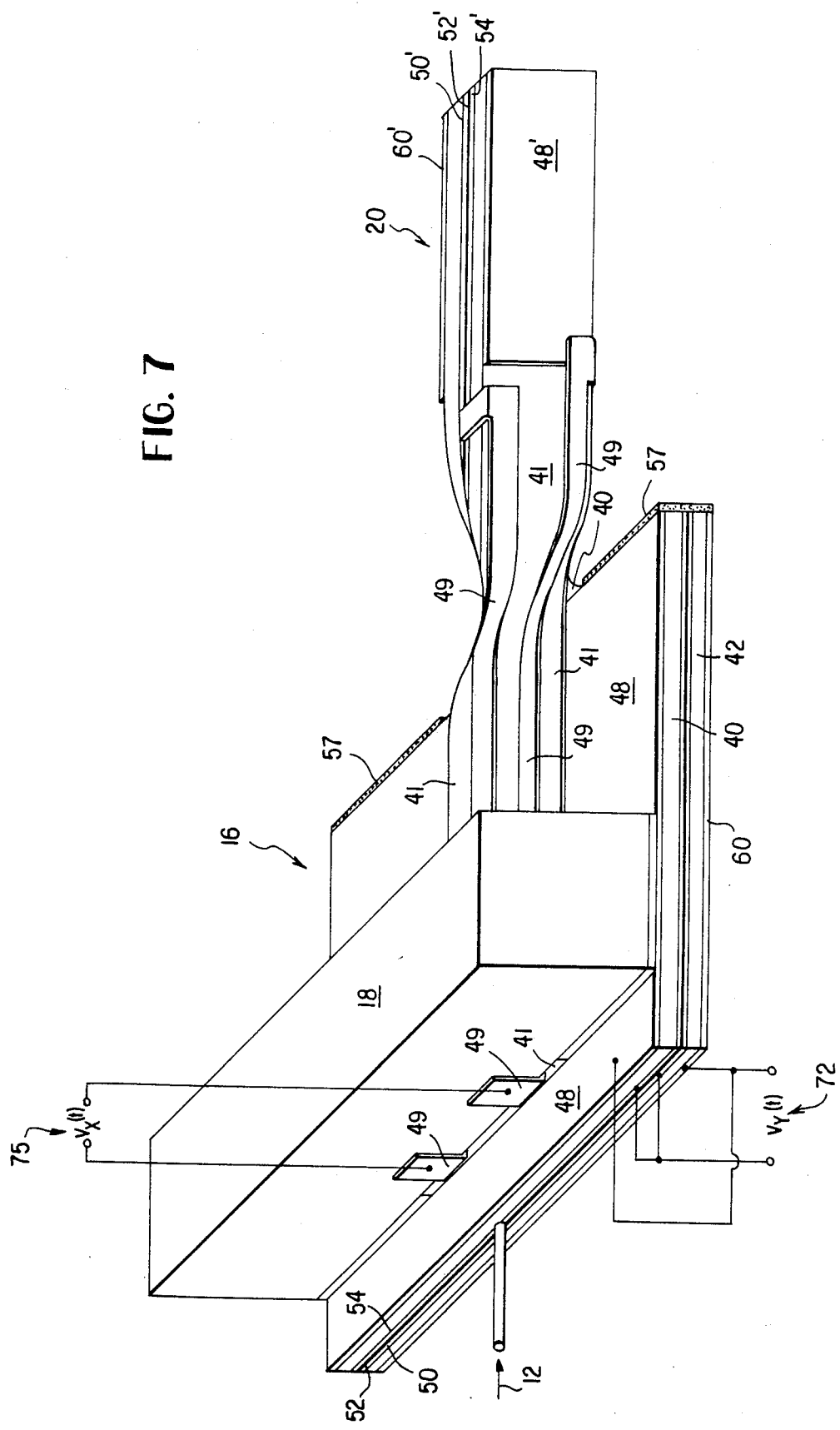
FIG. 7 is a perspective view similar to FIG. 2 of another embodiment, one wherein the X and Y scanner bimorph pieces are integral.

Referring now to FIG. 7 of the drawings, another embodiment is illustrated, similar to that described with respect to FIGS. 3a–3d. The main difference is that the second bimorph 20 is now formed as an integral portion of bimorph 16. In order that the planes of these two bimorph elements or modules may still retain their orthogonal relationship, the bimorph 20 is twisted 90° at the time of manufacture of the bimorph assembly. As illustrated at FIG. 7, one of the electrodes 49 extends to meet one of the outer conductive surfaces 48' and, while not fully illustrated, also extends underneath bimorph portion 20 to meet conductive surface 60'. The other electrode 49 (being the topmost electrode as shown at FIG. 7) is connected as indicated to the innermost conductive coatings 50' and 54'. Clearly, no connector 22 is here required. In all other respects, the construction and operation of this embodiment is the same as that described with respect to FIGS. 3a–3d, i.e., each bimorph is independently stimulated.

Figure 8:
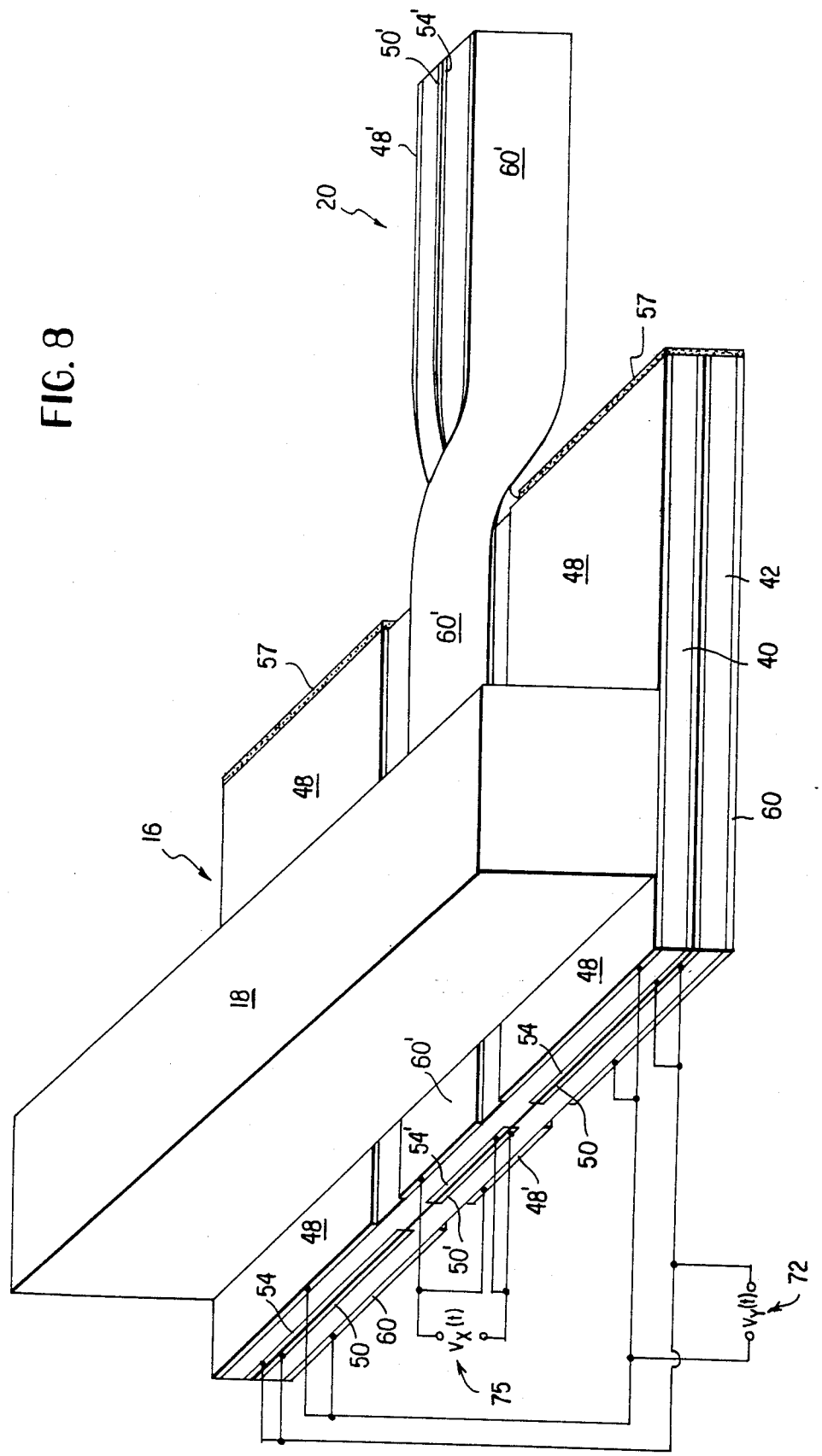
FIG. 8 is a perspective view of an embodiment similar to that of FIG. 7 but with different electric connections to the X-bimorph piece.

Referring now to FIG. 8 of the drawings, another modification is illustrated, similar to that of FIG. 7. The difference is a variation in the manner in which the electrical connections are made to the conductive sheets. As shown at FIG. 8, conductive sheet 60' of bimorph 20 extends rearwardly and along the top surface of bimorph 16. Similarly, outermost conductive surface 48' of bimorph 20 extends along the lower surface of bimorph 16. The innermost conductive surfaces 50' and 54' extend between piezoelectric layers 40 and 42 of bimorph 16, as indicated at the left portion of FIG. 8.

Single conductive layer 48 of the previously described embodiment of FIG. 7 is now split into two portions, as indicated in FIG. 8. The mode of operation of this embodiment is the same as that of the embodiment of FIG. 7.

Figures 9, 10:
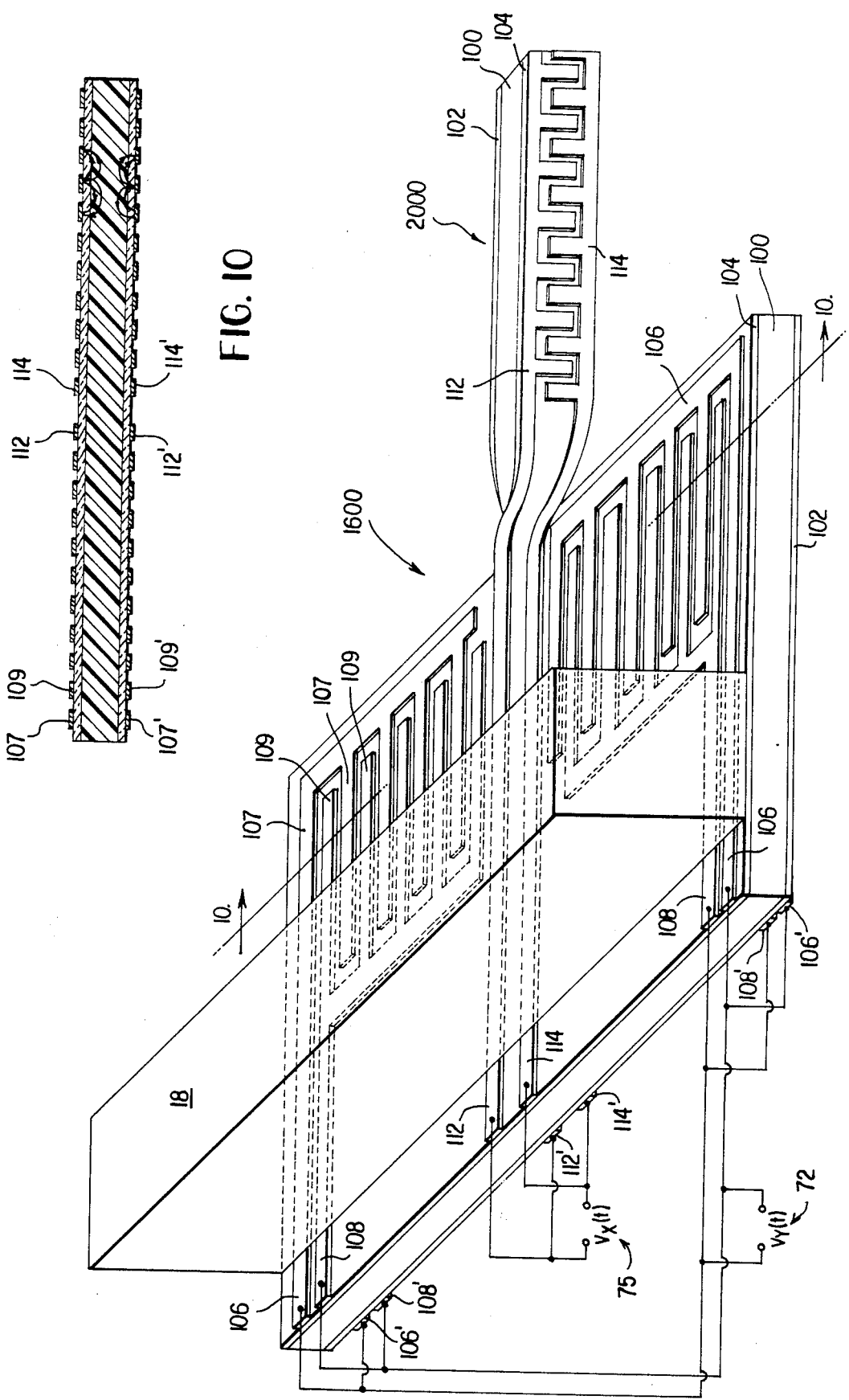
FIG. 9 is a perspective view of another modification, here ilustrating a single layer piezoelectric device, modified in accordance with this invention to yield a light deflecting device.
FIG. 10 is a view taken along section 10—10 of FIG. 9.

Referring now to FIGS. 9 and 10, still another embodiment is illustrated. Here, a single layer piezoelectric optical deflector device is illustrated which will perform substantially the same function as laminar or plural layer devices such as bimorph devices 16 and 20 previously described. The embodiment shown at FIGS. 9 and 10 is formed of a single piezoelectric piece, with the main piece or element denoted by the numeral 1600, with the auxiliary element denoted by the numeral 2000. As before, support block 18 is suitably attached, as by adhesive, to the rear edge of a main portion 1600, leaving the right hand edge, as viewed in FIG. 9, free to flex in an up and down direction so as to scan the Y direction. The right hand end, as viewed at FIG. 9, of appendage portion 2000 flexes in a horizontal direction to scan the X direction of screen 24. The numeral 100 denotes a piezoelectric layer of the same substance as the substance 40 or 42 of the embodiment of FIGS. 3a–3d. The numerals 102 and 104 denote optical coatings covering the entire bottom and top surfaces opposite, respectively, of layer 100. Their index of refraction is less than that of layer 100. The transparent piezoelectric material 100 is, by virtue of coatings 102 and 104, rendered totally internally reflecting so that a beam of light 12 entering one end of layer 100 will coherently exit from the other end. The same optical behavior is displayed by integral portion 2000 which lies in a plane at right angles to the plane containing portion 1600. The numeral 106 denotes a conductive coating having a plurality of spaced fingers 107. The numeral 108 denotes another conductive coating having spaced fingers 109, with fingers 107 and 109 being interdigitated, as shown on the right hand portion of FIG. 9. These conductive coatings and fingers are placed on the top surface of piezoelectric layer 100. The same numerals, although primed, denote corresponding elements applied to the bottom surface of piezoelectric layer 100. Additionally, the top surface of piezoelectric layer 100 is provided with electrodes 112 and 114 which extend along the top surface of layer 100 and are insulated therefrom. These electrodes extend to the integral, second light deflector portion 2000 and also are provided with spaced, interdigitated fingers, as illustrated at the right portion of FIG. 9. The left hand portion of deflector element 2000 is provided with similar electrodes and interdigitated fingers, corresponding elements being primed.

In operation, time varying electrical potentials are applied as indicated by $V_x(t)$ and $V_y(t)$ as before. The potentials $V_y$ cause flexing of main portion 1600, while potentials $V_x$ act along electrodes 112, 114, 112' 114' to cause corresponding flexing of the integral extension portion 2000. As indicated schematically at FIG. 10, these potentials generate lines of force between the various interdigitated fingers. The lines of force cause a bending moment transverse to the longitudinal axis of layer 100. Oppositely directed stresses at the top and bottom surfaces of layer 100 cause the bending.

The bending in this manner of a single layer piezoelectric element is already known. This is described, for example, in an article by M. Toda in Transactions of the IECE of Japan, Volume E61, No. 7, page 513, of 1978, hereby incorporated by reference. However, the prior art is not aware of optic coatings 102 and 104 which yield total internal reflection, in combination with piezoelectric layer 100. Further, the prior art is not aware of the configuration illustrated at FIG. 9 wherein an extension 2000 is provided, wherein the free end of main portion 1600 sweeps out vertical oscillations, with the extension sweeping out horizontal oscillations.

While FIGS. 3a, 3b, 3c, 3d show each bimorph 16, 20 as defined by two layers of bimorph material, any even number of layers may be employed for each. Further, the number of pairs of bimorph material layers may be different for 16 and 20. The same is true for the embodiment of FIGS. 7 and 8. Similarly, the number of optical fibers employed in the embodiment of FIG. 6 may be greater than one, thus defining an optical fiber bundle which can be a coherent fiber bundle.

FIGS. 11 and 12 illustrate yet another modification, these figures being similar to FIGS. 9 and 10, respectively. A single piezoelectric sheet is employed, the sheet provided with interdigitated finger electrodes, as shown at FIGS. 9 and 10. An internally conducting light fiber 80, 82 (identical to that fiber 80, 82 of FIG. 6) is carried as indicated. The modification of FIGS. 11 and 12 may be regarded as a combination of the single piezoelectric layer 100 modification of FIGS. 9 and 10, actuable in the same manner and of the same construction except for the absence of layers or coatings 102 and 104, and the light fiber 80, 82 modification of FIG. 6.

I claim:

1. An optical device for deflecting a beam of light, the device including a flexing piezoelectric sheet element of known construction having associated electrodes and interdigitated fingers attached to the sheet, the electrodes and fingers positioned both on the top and bottom opposite surfaces of the piezoelectric sheet, the improvement comprising, the sheet element being optically coated over its opposite top and bottom surfaces so as to totally internally conduct a beam of light entering the sheet through the edge of the sheet and passing therethrough along a longitudinal axis of the sheet element, the optical coating being in addition to and distinct from the associated electrodes, the index of refraction of the optical coating being less than the index of refraction of the piezoelectric sheet element whereby when electrically stimulated, the sheet flexes, and the beam of light exiting from the opposite edge of the sheet sweeps out an arc.

2. The optical device of claim 1 wherein the said sheet element comprises a main portion lying in a first plane and further comprises an extension of the main portion lying in an orthogonal plane, the extension having its longitudinal, optic axis colinear with the longitudinal optic axis of the said main portion, the extension having its own, separate associated electrodes and interdigitated fingers on its opposite surfaces, and also being optically coated over its opposite surfaces, whereby both the extension and the main portion are independently electrically stimulated so that their respective light exiting ends flex in arcs which lie in mutually orthogonal planes, whereby a beam of light projected into the optical device along the longitudinal axis of the main portion passes therethrough and also passes along the colinear longitudinal axis of the extension to sweep out a raster pattern over a viewing screen.

3. The optical device of claim 2 wherein the said extension is integral with the said main portion.

4. The optical device of claim 2 wherein the mass of the main portion is greater than the mass of the extension, whereby the extension is flexed at a higher frequency than the flexing of the main portion without disturbing the flexing of the main portion.

5. An optical device for deflecting a beam of light, the device including a flexing piezoelectric bimorph of the known type having associated electrodes extending over opposite surfaces of each piezeoelectric layer, the bimorph defined by at least two piezoelectric sheets, at least one sheet of which is light conducting, the bimorph flexing upon the application to its electrodes of stimulating electrical potentials, the improvement comprising, one end of the bimorph receiving a beam of light, at least one piezoelectric layer of the bimorph being optically conducting and optically coated over and next to its opposite surfaces, the optical coating being in addition to and distinct from the associated electrodes, the index of refraction of the optical coating being less than the index of refraction of the at least one optically conducting piezoelectric layer so as to totally internally conduct the beam of light through the said at least one piezoelectric bimorph layer along its longitudinal axis whereby when electrically stimulated, the bimorph flexes, and the beam of light exiting from the opposite, free edge of said at least one optically conducting piezoelectric layer sweeps out an arc.

6. The optical device of claim 5 wherein the said bimorph comprises a main portion lying in a first plane and further comprises an extension of the main portion lying in an orthogonal plane, the extension being of the same construction, the extension having a longitudinal, optic axis colinear with the longitudinal, optic axis of the said main bimorph portion, the said main portion and the said extension each provided with separate electrodes so as to be independently electrically stimulated, whereby both the extension and the main portion may be independently electrically stimulated so that their respective light exiting ends flex in arcs which lie in mutually orthogonal planes, whereby the beam of light received by the optical device passes along a longitudinal axis of the main bimorph portion and also passes along the colinear longitudinal axis of the at least one bimorph layer of the extension which has been optically coated to sweep out a raster pattern over a viewing screen.

7. The optical device of claim 6 wherein the said extension is integral with the said main portion.

8. The optical device of claim 6 wherein the mass of the main portion is greater than the mass of the extension, whereby the extension is flexed at a higher frequency than the flexing of the main portion without disturbing the flexing of the main portion.

9. An optical device for deflecting a beam of light, the device including a flexing piezoelectric sheet element of known construction having associated electrodes and interdigitated fingers attached to the sheet, the electrodes and fingers positioned both on the top and bottom opposite surfaces of the piezoelectric sheet, the improvement comprising, the sheet element carrying an internally conducting light fiber whereby when electrically stimulated, the sheet flexes, and a beam of light passed into one end of the light fiber exits from the opposite end of the fiber and sweeps out an arc.

10. The optical device of claim 9 wherein the said sheet element comprises a main portion lying in a first plane and further comprises an extension of the main portion lying in an orthogonal plane, the extension having its longitudinal, optic axis colinear with the longitudinal optic axis of the main portion, the extension having its own, separate associated electrodes and interdigitated fingers on its opposite surfaces, the light fiber extending along said optic axes, whereby both the extension and the main portion are independently electrically stimulated so that their respective light exiting ends flex in arcs which lie in mutually orthogonal planes, whereby a beam of light projected into the light fiber passes therethrough and also passes along the colinear longitudinal axis of the extension to sweep out a raster pattern over a viewing screen.

11. An optical device for deflecting a beam of light, the device including a flexing piezoelectric bimorph of the known type having associated electrodes extending over opposite surfaces of each piezoelectric layer, the bimorph flexing upon the application to its electrodes of stimulating electrical potentials, the improvement comprising, the bimorph carrying an internally light conducting fiber for receiving a beam of light, whereby when electrically stimulated, the bimorph flexes, and the beam of light exiting from the opposite end of the fiber sweeps out an arc.

12. The optical device of claim 11 wherein the said bimorph comprises a main portion lying in a first plane and further comprises an extension of the main portion lying in an orthogonal plane, the extension being of the same construction, the extension having a longitudinal, optic axis of the said main bimorph portion, the said main portion and the said main extension each provided with separate electrodes so as to be independently electrically stimulated, the light fiber extending along said optic axis, whereby both the extension and the main portion may be independently electrically stimulated so that their respective light exiting ends flex in arcs which lie in mutually orthogonal planes, whereby the beam of light received by the light fiber passes out the other end to sweep out a raster pattern over a viewing screen.

* * * * *